United States Patent [19]

Davis

[11] Patent Number: 5,038,479

[45] Date of Patent: Aug. 13, 1991

[54] FINGER KNIFE

[76] Inventor: William N. Davis, 914 Pueblo, Hobbs, N. Mex. 88240

[21] Appl. No.: 577,389

[22] Filed: Sep. 4, 1990

[51] Int. Cl.[5] ........................ B26B 27/00; B26B 13/00; A47J 23/00

[52] U.S. Cl. ..................................... 30/298; 30/113.1; 30/232

[58] Field of Search ....................... 30/294, 298, 298.4, 30/290, 178, 231, 232, 109, 111, 113.1

[56] References Cited

U.S. PATENT DOCUMENTS

| | | | |
|---|---|---|---|
| D. 200,425 | 2/1965 | Jordan . | |
| 224,975 | 2/1889 | White . | |
| 606,036 | 6/1898 | Stoecker . | |
| 783,859 | 2/1905 | Bowden . | |
| 1,028,667 | 6/1912 | Billau . | |
| 1,074,864 | 10/1913 | Howell . | |
| 1,180,212 | 4/1916 | Veatch . | |
| 1,398,919 | 11/1921 | Schwarting . | |
| 1,432,316 | 10/1922 | Binkis | 30/298 |
| 1,891,688 | 12/1932 | Parker et al. | 30/232 |
| 2,470,905 | 5/1949 | Springer et al. | 30/113.1 |
| 2,601,724 | 7/1952 | Jones | 30/294 |
| 2,676,400 | 4/1954 | Darpinian | 30/151 |
| 3,014,506 | 12/1961 | Crimmins et al. | 30/298 |
| 3,262,204 | 7/1966 | Holthaus | 30/298 |
| 3,748,742 | 7/1973 | Bigler et al. | 30/294 |
| 3,888,006 | 6/1975 | Roberts | 30/298 |
| 4,339,878 | 7/1982 | Tozzi | 30/298 |
| 4,348,832 | 9/1982 | Hauser | 47/1 R |
| 4,394,796 | 7/1983 | Winer | 30/178 |
| 4,805,070 | 2/1989 | Lucas, Jr. et al. | 30/298 |

*Primary Examiner*—Douglas D. Watts
*Assistant Examiner*—Paul M. Heyrana, Sr.
*Attorney, Agent, or Firm*—Marcus L. Bates

[57] ABSTRACT

A device for cutting the stems of plants, such as flowers and the like, at an angle so that the stems can be easily forced into a support base such as foam plastic material. The device has an outwardly opening blade holder affixed to a ring member. A mount means supports the cutting blade within the blade holder. A cutting edge on the blade is spaced inwardly of the terminal ends of said legs where it is unlikely to inadvertently be engaged and cut the thumb. A spur is attached to the ring at a location spaced from the blade holder. The spur extends from the ring and is adapted to be received against the ring finger when the ring is received about the forefinger. The device is attached to the forefinger of one hand and can be manipulated to cut plant stems at an angle. The mount means includes a blade receiving slot that is formed within each of the legs, and the blade is positioned within the slot with the cutting edge thereof extending from one to the other leg. The thickness of the slot is changed to removably capture the blade therein.

19 Claims, 1 Drawing Sheet

FINGER KNIFE

BACKGROUND OF THE INVENTION

Hand held cutting devices are known to those skilled in the art and take on a number of different forms as evidence by the accompanying "Prior Art Statement". It is desirable to have made available a cutting apparatus or finger knife that can be manipulated by one hand while another object, such as a plant, is held in the other hand. It would be more desirable to have a device for suitably cutting plant stem sat an angle, thereby leaving a predetermined stem length that allows the plant to be forced to penetrate into an unprepared body of foam plastic or the like. Further, it would be advantageous to have such a device that remained comfortably attached to one's hand as a plurality of plants are sequentially cut to proper length and inserted into the plastic base. Such a device should also be designed to avoid inflicting injury and cuts to the user.

A hand held cutting device that overcomes the above disadvantages while providing the recited advantages is the subject of this invention.

SUMMARY OF THE INVENTION

This invention comprehends a hand held cutting apparatus for cutting plant stems at an angle and selected length, so that the resultant plant stem can easily be inserted into an unprepared base, such as a body of foam plastic material. The apparatus of this invention comprises a blade holder a cutting blade having a cutting edge, means for supporting the blade within the blade holder, a finger receiving ring attached to the blade holder, and a stabilizing spur attached to and extending from the ring.

More specifically, the apparatus further includes a blade holder that has U-shaped spaced legs suitably attached to the finger receiving ring; and the legs extend in parallel relationship away form the ring. The legs have a terminal end that is adapted to be engaged by the thumb, and to limit the proximity of the thumb and blade cutting edge while allowing the cutting edge of the blade to efficiently cut the stem of a plant that is positioned between the thumb and blade cutting edge.

In one embodiment of the invention, the ring has a centerline; the blade holder has a centerline that is arranged substantially perpendicular respective to the ring centerline; the cutting edge on the blade is spaced inwardly of the terminal ends of the legs and a spur is attached to the ring at a location spaced from the blade holder. The spur extends from the ring and is of a size and shape adapted to be comfortably and securely received against one's second finger in a manner to stabilize the entire apparatus on the forefinger to thereby increase its utility and bring about further unexpected and desirable results.

In the preferred embodiment, the means for supporting the blade includes a blade receiving slot that is formed within the blade holder and each of the legs, and the blade is positioned within the slot with the cutting edge thereof extending from one to the other leg. The spur underlies the ring and blade and preferably is curved away from the blade holder. The blade holder and the ring are bisected by a common plane and the blade is intersected by the plane and lays at an acute angle to the plane.

The legs of the blade holder preferably are of a relatively thick section at the opposed ends thereof and have a relatively thinner central part. The blade holder includes a blade receiving slot that extends into the legs, and the blade is positioned within the slot with the cutting edge thereof extending from one to the other leg; with the slot terminating in spaced relation respective to the terminal ends of the legs and extending into the interior of the ring. A fastener means is included by which the size of the slot is changed to thereby removably capture the blade therein.

Accordingly, a primary object of the present invention is the provision of a hand held device for cutting plant stems at an angle and a selected length by compressing the stem of the plant between the device and one's thumb while holding the plant with the other hand.

Another object of the present invention is the provision of an apparatus for cutting plant stems at an angle to facilitate forcing the cut stem into a foam plastic support base.

A further object of this invention is the provision of a device for preparing plants by cutting the stem thereof; wherein the device is received about one's forefinger and steadied with the second finger, whereupon the thumb presses the stem into engagement with a cutting edge of the device and to thereby cut the stem at a predetermined angle and length.

A still further object of this invention is the provision of a device for cutting the stems of plants, such as flowers and the like, comprising an outwardly opening U-shaped blade holder having spaced legs, an annular finger receiving ring attached to the blade holder, mount means for supporting a blade within the blade holder; with there being a cutting edge on the blade that is spaced inwardly from the terminal ends of the blade holder, and a spur attached to the ring for steadying the device against one's second finger while plant stems are cut.

These and other objects and advantages of the present invention will become readily apparent to those skilled in the art upon reading the following detailed description and claims and by referring to the accompanying drawings.

The above objects are attained in accordance with the present invention by the provision of apparatus fabricated in a manner substantially as described herein.

DETAILED DESCRIPTION OF THE PREFERRED EMBODIMENT

Figure 1:
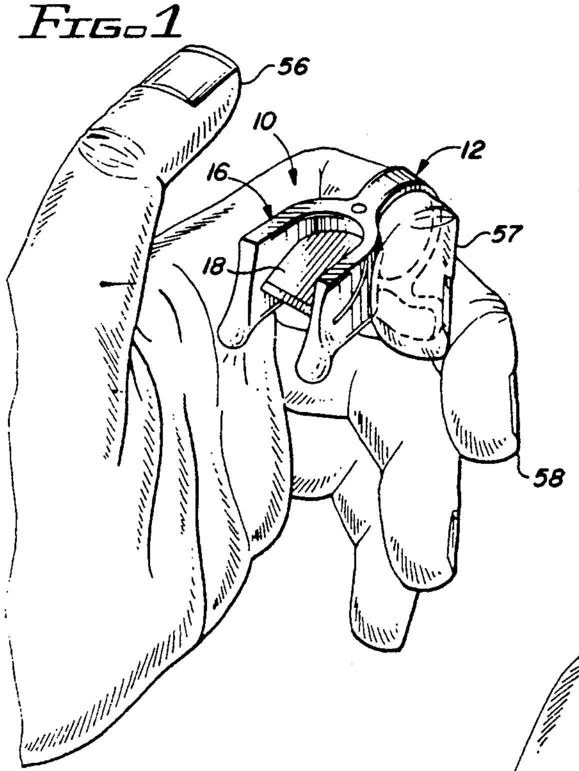
FIG. 1 is a perspective view of a cutting apparatus made in accordance with the present invention, shown attached to a person's hand.
Figure 3:
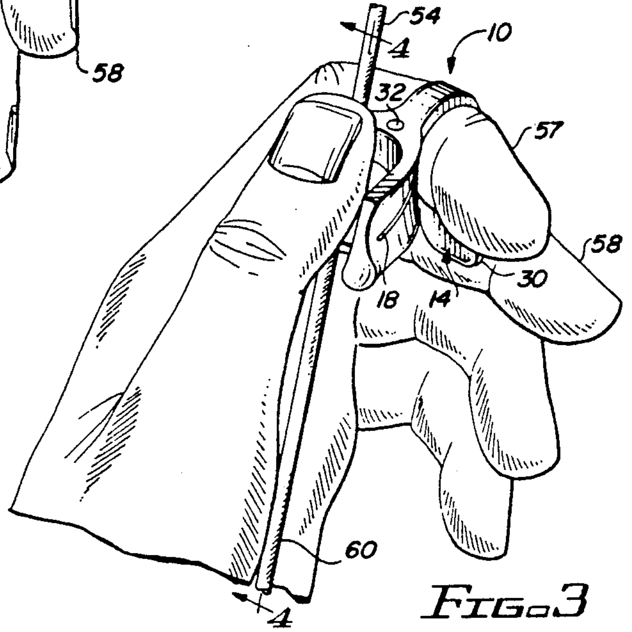
FIG. 3 shows the apparatus of FIG. 1 in operation.

FIG. 1 of the drawings discloses a cutting apparatus, or finger knife device 10 for cutting the stems of plants. The apparatus includes an annular ring member 12, of slightly oblated substantially circular configuration, which can be received comforably on the forefinger of one's hand, as illustrated in FIGS. 1 and 3, for example. A spur 14 is attached to the ring member and extends therefrom for engagement with the second finger of a person's hand, as illustrated in FIGS. 1 and 3, for example. The spur is spaced from a blade holder 16.

The blade holder 16 includes means associated therewith for supporting a blade 18 therein. In the specific embodiment of FIGS. 2 and 4, blade 18 is received within a slot 19, 19'. The slot begins at 19 inside the ring and continues into the blade holder and terminates at 19', as specifically illustrated in FIG. 4.

The blade holder 16 includes spaced legs 20, 22 which form an outwardly opening U-shaped cavity 24 within which the before mentioned blade 18 resides in a particular manner. Numeral 26 indicates a cutting edge of blade 18, and it will be noted that the cutting edge 26 is located entirely within cavity 24 and is therefore spaced inwardly of the illustrated terminal ends of legs 20 and 22.

Figure 2:
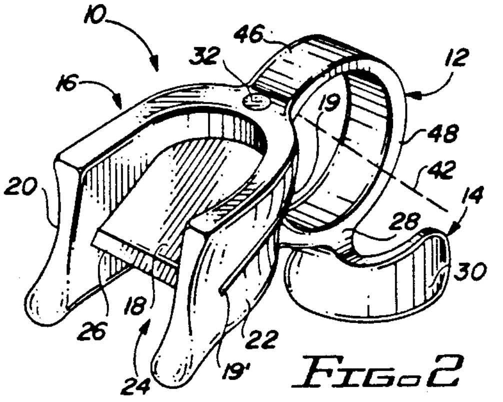
FIG. 2 is a perspective view of the apparatus disclosed in FIG. 1.
Figure 5:
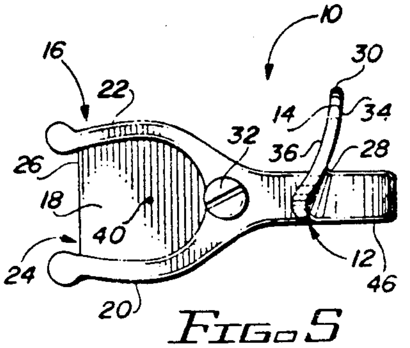
FIG. 5 is a bottom view of the apparatus disclosed in FIGS. 2 and 4.

FIGS. 2 and 5 show spur 14 attached to the ring member at 28. The spur has a free end 30 opposed to the attachment point 28.

A fastener 32 extends through the joinder of the ring member and blade holder and squeezes the blade in slot 19, 19'. The spur has opposed curved surfaces 34 and 36, with surface 34 being convex for comfortably bearing against the second finger and adding great stability to the device. The opposed surface 36 is concave. It will be noted that the spur has a curved lower surface 38 between the opposed ends thereof. The spur is positioned to form a substantial angle with respect to the centerline 42 of the ring member.

Figure 4:
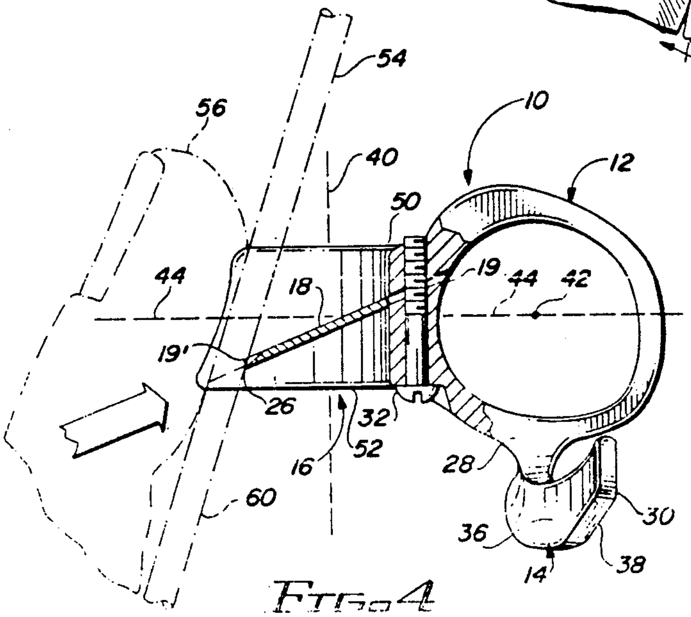
FIG. 4 is a cross-sectional view taken along line 4—4 of FIG. 3.

Centerline 40 of the blade holder is indicated in FIGS. 4 and 5 and is intended to be a reference line or axis that is more or less equidistant from the interior cylindrical or curved surface that forms the inner wall of the illustrated u-shaped blade holder, noting in FIG. 5 that the marginal terminal ends of the legs are tangential respective to the medial circular part of the blade holder. Several other geometrical configurations, including an ellipse, can be embodied in the blade holder 16 while remaining within the scope of the claimed invention. The centerline 40 can be the focus of an elliptical configured blade holder, as another example.

Axis 40 lies perpendicular and spaced from axis 42 of the ring 12. A plane 44 passes through and bisects blade holder 16, blade 18, and ring member 12. It will be noted that blade 18 lies at an acute angle respective to plane 44, with the angle between the blade and plane 44 determining the angle of the cut made to the plant stem 54; a 20 degree angle being preferred.

As specifically shown in FIGS. 2 and 4, ring member 12 has opposed sides 46 and 48. The blade holder has top and bottom surfaces 50, 52 illustrated herein as being parallel to one another and of unequal area so as to accommodate the thumb more comfortably.

In FIGS. 3 and 4, a stem 54 of a plant is operatively positioned against cutting edge 26 and a thumb 56 presses stem 54 toward the cutting edge 26. Numeral 57 indicates a forefinger while numeral 58 indicates the second finger. Numeral 60 of FIG. 4 indicates the discarded stem portion.

In operation, the ring member 12 is securely and comfortably placed about one's forefinger while the second finger is brought to bear against the convex side of the stabilizing spur 14, in the manner of FIGS. 1 and 3. With the cutting device 10 securely held in this position of operation, a flower stem can be cut in either of the following manipulative manners:

The forefinger presses terminal end of the blade holder against the plan of one's hand with the plant stem being located between the heal of the palm and the cutting edge of the blade. As the end of the blade holder presses against the palm of one's hand, the plant stem is pulled, thereby severing the stem in the indicated manner of FIG. 4, whereupon the resultant pointed stem can immediately be forced into a suitable plant support, such as a styrofoam body, for example.

Preferably, the plant stem is placed between the thumb and the cutting edge 26 in the illustrated manner of FIGS. 3 and 4, and the plant stem and cutting edge are moved relative to one another, thereby severing the stem in the indicated manner of FIG. 4, whereupon the prepared stem portion 54 can be inserted into a suitable support, while residual stem part 60 is discarded.

The apparatus of the present invention can remain on one's forefinger while both hands are being sued for arranging the plants and carrying out other manipulative actions, thereby making the apparatus instantly available for cutting stems in a new, unobvious and patentable manner heretofore unknown to those skilled in the art. The apparatus can be rotated 180 degrees on the forefinger to place the blade holder towards the back of the hand where the apparatus is conveniently stored until needed again.

I CLAIM:

1. A device adapted to be worn on one's forefinger for cutting the stems of plants such as flowers and the like, comprising an outwardly opening blade holder, said blade holder has a medial part and opposed spaced legs having terminal ends, an annular finger receiving ring member attached to said medial part of said blade holder, said spaced legs extend from said ring member and from said medial part; said ring member has a centerline; said blade holder has a centerline that is perpendicular respective to the ring member centerline;

a cutting blade, mount means for supporting said blade within said blade holder; a cutting edge on said blade is spaced inwardly of the terminal ends of said spaced legs; the terminal ends of said spaced legs are adapted to be engaged by one's thumb;

and a spur attached to said ring member at a location spaced from said blade holder, said spur extends from said ring member and is adapted to be received against one's second finger when the ring member is received about one's forefinger;

whereby; said device can be manipulated by the fingers of one's ones hand to cut plant stems at an angle when the ring member is placed about one's forefinger, said spur bears against one's second finger and thereby stabilizes the device while a plant stem to be severed is pressed between the cutting blade and one's thumb.

2. The device of claim 1 wherein said mount means includes a blade receiving slot that is formed within each said spaced leg and said cutting blade is positioned within said blade receiving slot with the cutting edge thereof extending from one to the other spaced leg.

3. The device of claim 2 wherein said spur underlies said ring member and said cutting blade, and said spur is curved away from said blade holder.

4. The device of claim 1 wherein said blade holder and said ring member are bisected by a common plane and said cutting blade is intersected by the plane and lays at an angle to the plane.

5. The device of claim 4 wherein each said spaced leg is of relatively thick section at opposed ends thereof and has a relatively thin central part.

6. The device of claim 1 wherein said mount means includes a blade receiving slot that is formed within each said spaced leg and said cutting blade is positioned within said slot with the cutting edge thereof extending from one to the other spaced leg;

said slot terminates in spaced relation respectively to the terminal ends of said spaced legs and extends into the interior of the ring member; and a fastener means by which the thickness of said slot is changed to thereby removably capture said cutting blade therein.

7. A hand held cutting apparatus adapted to be worn on one's forefinger for cutting plant stems, comprising:

a blade holder, a cutting blade with a cutting edge, mount means for supporting said blade within said blade holder; a finger receiving ring attached to said blade holder, and a stabilizing spur attached to and extending from said ring;

said blade holder has spaced legs attached to said finger receiving ring; said spaced legs extend from said ring and each of said spaced legs has a terminal end that is adapted to be engaged by the thumb; said ring has a centerline; said blade holder has a centerline that is arranged substantially perpendicular respective to the ring centerline;

said cutting edge on said blade is spaced inwardly of the terminal ends of said legs;

said spur is attached to said ring at a location spaced from said blade h older, said spur extends from said ring and is adapted to be received against one's second finger.

8. The apparatus of claim 7 wherein said mount means includes a blade receiving slot that is formed within each said spaced leg and said blade is positioned within said slot with the cutting edge thereof extending from one to the other spaced leg.

9. The apparatus of claim 7 wherein said spur underlies said ring and blade and is curved away from said blade holder.

10. The apparatus of claim 7 wherein said blade holder and said ring are bisected by a common plane an said blade is intersected by the plane and lays at an acute angle to the plane.

11. The apparatus of claim 7 wherein each said spaced leg is of relatively thick section at the opposed ends thereof and has a relatively thin central part.

12. The apparatus of claim 7 wherein said mount means includes a blade receiving slot that is formed within each said spaced leg and said blade is positioned within said slot with the cutting edge thereof extending from one to the other spaced leg;

said slot terminates in spaced relation respective to the terminal ends of the legs and extends into the interior of the ring; and a fastener means by which the size of said slot is changed to thereby removably capture said cutting blade therein.

13. Apparatus for cutting the stems of plants such as flowers and the like comprising an outwardly opening blade holder, said blade holder is of elliptical configuration and has an apex from which spaced legs extend; said legs have a terminal end; and annular finger receiving ring member attached to said apex, said ring member has a centerline spaced from said apex; said blade holder has a centerline spaced from said apex and extends perpendicular respective to the ring member centerline;

a cutting blade, means for supporting said blade within said blade holder; a cutting edge on said blade is spaced inwardly of the terminal ends of said spaced legs;

a spur attached to and extending from said ring member at a location spaced from said blade holder, said spur is adapted to be received against one's second finger;

whereby; said apparatus can be placed on one's forefinger, with said spur bearing against one's second finger, and one's thumb can be pressed against the ends of the spaced legs, whereupon a plant stem located between one's thumb and said cutting blade will be cut.

14. The apparatus of claim 13 wherein said blade holder includes a blade receiving slot that is formed within each said leg and said cutting blade is positioned within said slot with the cutting edge thereof extending from one to the other spaced leg.

15. The apparatus of claim 13 wherein said spur underlies said ring member and said cutting blade and is curved away from said blade holder.

16. The apparatus of claim 13 wherein said blade holder and said ring member are bisected by a common plane and said cutting blade is intersected by the plane and lays at an angle to the plane.

17. The apparatus of claim 13 wherein each said spaced leg is of relatively thick section a the opposed ends thereof and has a relatively thin central part.

18. The apparatus of claim 17 wherein said blade holder includes a blade receiving slot that is formed within each said spaced leg and said cutting blade is positioned within said slot with the cutting edge thereof extending from one to the other spaced leg;

said slot terminates in spaced relation respective to the terminal ends of said spaced legs and extends into the interior of said ring member; and a fastener means by which the thickness of said slot is changed to thereby removably capture the blade therein.

19. The apparatus of claim 13 wherein said outwardly opening blade holder includes a blade receiving slot that is formed within each said spaced leg and said cutting blade is positioned within said slot with the cutting edge thereof extending from one to the other spaced leg; said spur underlies said ring member and cutting blade and is curved away from said blade holder; said blade holder and said ring member are bisected by a common plane and said blade is intersected by the plane and lays at an angle to the plane;

each said spaced leg is of relatively thick section at the opposed ends thereof and has a relatively thin central part; said blade holder includes a blade receiving slot that is formed within each said spaced leg and said blade is positioned within said slot with the cutting edge thereof extending from one to the other spaced leg;

said slot terminates in spaced relation respective to the terminal ends of the legs and extends into the interior of the ring member; and a fastener means by which the thickness of said slot is changed to thereby removably capture said cutting blade therein.

* * * * *